Patented June 17, 1930

1,764,085

UNITED STATES PATENT OFFICE

HARRY PLACAK, OF CLEVELAND, OHIO, ASSIGNOR TO THE G. E. CONKEY COMPANY OF CLEVELAND, OHIO, A CORPORATION OF OHIO

VITAMIN FOOD AND METHOD OF PRODUCING SAME

No Drawing.   Application filed September 8, 1927.   Serial No. 217,538.

This invention pertains to a so-called vitamin food for poultry and animal feeding, and to a method of producing the same. It is a concentrate in the sense that it is extremely high in vitamin content and is intended especially for mixing with other foodstuffs, such as mash and other cereal products.

According to a desirable embodiment of the invention, my improved vitamin food consists of a mixture of permeable vegetable substance in granular form that is rich in vitamin B, such as yeast, soya bean meal—preferably a combination of the two—or other equivalent material, and an oil that is rich in vitamins A and D, for example, cod liver or other fish oil, together with a suitable wax or wax-like ingredient, such as paraffine, that preserves the oil and serves to fix or bind it, so to speak, within the interstices or cells of the granular vegetable substance.

Attempts have been made heretofore with a measurable degree of success to seal cod liver oil or the like in granular yeast or a similar substance, by impregnating the latter with the former and coating the resultant product with an air excluding material, such as Karaya gum. This is covered by Letters Patent No. 1,633,711, of June 28, 1927. A weakness inherent in this product itself, or a fault incident to the method of manufacturing it, is evidenced by the fact that the oil eventually seeps through the film or coating of gum and rapidly deteriorates and becomes rancid, rendering the product unduly oily and unsatisfactory for feeding purposes. What appears to be lacking is a means of maintaining captive or fixed the oil within the granules of the permeable substance. It is the fundamental purpose of my invention to overcome this difficulty, and it is accomplished by means of the wax or wax-like ingredient, as will hereinafter appear.

In the production of my improved vitamin food in accordance with the present preferred form of the invention, a quantity of paraffine, say two and one-half to five pounds, is placed in a kettle and melted by the application of heat, desirably through the intervention of a water bath to insure against too intense a heat. To this melted paraffine is added ten pounds of cod liver oil. The oil being cool momentarily chills the paraffine, causing it to whiten to a certain extent, and the mixture is now allowed to remain subjected to the heat until it clears—that is, until the paraffine is re-melted. The mixture is then stirred thoroughly and removed from the heat and while it is still in a liquid condition, a dry granular vegetable substance, such as yeast, soya bean meal, or a mixture of both, in quantity sufficient to absorb the mixture, is stirred into the melted paraffine and oil. The granular substance should be of the lowest possible moisture content so that it will instantly absorb the paraffine and oil to its maximum capacity. At this stage, the mixture is in a more or less homogeneous mass, the particles sticking together and balling. The stirring is continued until the mixture is reduced to a granular condition when it is emptied from the kettle onto a suitable surface, such as a steel plate, to cool.

When the product cools, the wax or paraffine hardens, which fixes the oil so that it is no longer in a liquid condition but is in a solid state. In this condition, the oil is preserved indefinitely and the keeping quality of the product is greatly enhanced.

With the oil thus confined, it may be desirable to coat the granules of the product with Karaya gum or the like, somewhat in accordance with the previously mentioned patent, and this may be accomplished by introducing the gum, dissolved in a proper proportion of water, into the mixture while it is still hot or warm and before it is removed from the kettle so that the mixture may be stirred to thoroughly coat the individual granules with the gum.

It may be mentioned that the paraffine or any substitute wax selected for admixture with the oil should, when the two are mixed, have a melting point not exceeding the body temperature so that the oil will be liberated in the stomach.

Having thus described my invention, what I claim is:—

1. A food product of the class described consisting of a permeable substance impregnated with a wax-like material, such as paraffine, containing a vitamin-potent oil.

2. A food product of the class described comprising a permeable substance in granular form whose individual granules are impregnated with a wax-like material containing a vitamin-potent oil.

3. A food product of the class described comprising a granular vegetable substance the individual grains of which are permeated with a wax-like material, such as paraffine, containing a vitamin-potent oil.

4. A food product of the class described comprising dried yeast in granular form, the granules of which are permeated with a wax-like material, such as paraffine, containing a vitamin-potent oil.

5. A food product of the class described comprising a permeable substance in granular form whose individual units are impregnated with a solidified mixture of paraffine and a vitamin-containing oil.

6. The herein described method which consists in impregnating a permeable substance in granular form with a mixture of melted wax-like material and a vitamin-containing oil and allowing the resultant product to cool thereby to solidify the mixture.

7. A food product of the character described comprising a vitamin containing vegetable substance in granular form, the individual granules of such mixture being permeated with paraffine and cod liver oil.

8. A food product comprising from two and one-half to five pounds of paraffine, ten pounds of cod liver oil and sufficient dry granular vegetable material to absorb the mixture so as to provide a more or less homogeneous mass.

9. The herein-described method, which consists in placing a quantity of paraffine in a suitable receptacle, applying heat to the receptacle to melt the paraffine, adding to the mixture a predetermined quantity of cod liver oil, allowing the mixture to remain subjected to the heat until it is clear, agitating the mixture and while it is still in a liquid condition adding a predetermined quantity of dry, granular, vegetable material and stirring the said vegetable material into the melted mixture, stirring the mixture until the same is reduced to a homogeneous, granular condition and finally cooling the mass so obtained.

In testimony whereof, I hereunto affix my signature.

HARRY PLACAK.